March 1, 1966 J. E. BEGGS 3,238,411
CONTROL GRID STRUCTURE FOR ELECTRIC DISCHARGE DEVICE
Filed Nov. 21, 1962

Inventor:
James E. Beggs,
by Richard R. Brainard
His Attorney.

United States Patent Office 3,238,411
Patented Mar. 1, 1966

3,238,411
CONTROL GRID STRUCTURE FOR ELECTRIC
DISCHARGE DEVICE
James E. Beggs, Schenectady, N.Y., assignor to General
Electric Company, a corporation of New York
Filed Nov. 21, 1962, Ser. No. 239,116
5 Claims. (Cl. 313—348)

The present invention relates to an improved control grid construction for electric discharge devices and particularly to a taut grid for planar electrode discharge devices.

In many electric discharge devices the area through which the discharge takes place is subdivided by fine wires or mesh of a control grid. In devices of this character, particularly of the planar type where very close grid-cathode spacings are employed, difficulty is experienced in maintaining the grid sufficiently planar during operation to avoid short-circuiting of the grid wires to the cathode or to each other. This difficulty is caused in part by the difference in operating temperatures of different portions of the grid and the resultant sagging of the grid wires. It is accordingly an important object of my invention to provide an improved grid structure including a plurality of parallel grid wires which are maintained taut planar during operation of the device so that short circuits are, accordingly, minimized.

In accordance with the preferred embodiment of my invention illustrated, a plurality of rigid support conductors extend generally transversely of the fine control grid wires and are bonded to these grid wires and also to the grid frame. Different ones of the support wires are free to move, as they expand, in opposite directions. In the embodiment illustrated this may be accomplished by making the support wires substantially L-shaped and supporting them so that one arm of the L is parallel to the grid wires and the other arm is transverse. Movement of the transverse portion tends to keep the grid wires spaced and taut and since the L-shaped member is free to bend, it does not distort the grid out of the normal plane of the grid. Some of the advantages of this structure may be realized by simply arranging straight supporting conductors, alternate ones of which are bonded to the grid frame on opposite sides of the grid wires.

Further objects and advantages which characterize the present invention will become apparent as the following description proceeds, reference being had to the accompanying drawing and its scope will be pointed out in the appended claims.

In the drawing FIG. 1 is a plan view of a parallel wire planar grid construction;

Figure 1:
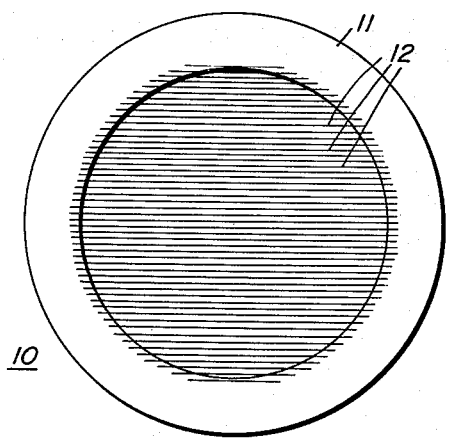
Figure 2:
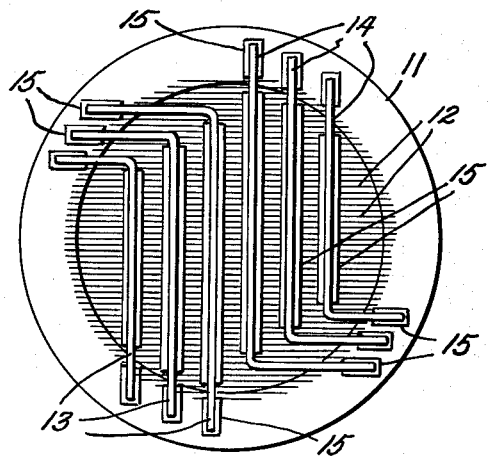
FIG. 2 shows the same grid with the support wires arranged in position ready for bonding.
Figure 3:
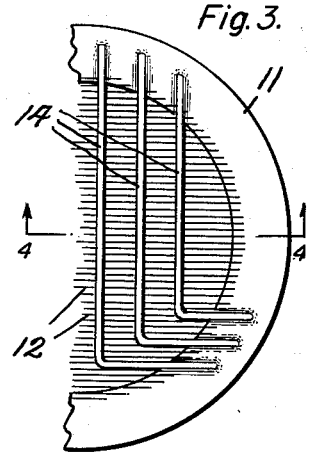
FIG. 3 shows a portion of the grid of FIG. 2 after the bonding operation is complete.

Referring now to the drawing, I have shown my invention embodied in a planar circular grid structure 10 including a grid supporting annular ring 11 and a plurality of parallel grid wires 12. As shown in FIG. 2 a plurality of rigid supports, preferably of L-shape, are arranged with the long portions of the L transverse to the parallel grid wires. As illustrated there are six such support wires arranged in two groups 13 and 14 with the wires 13 extending oppositely with respect to the wires 14 as far as the location of the arm of the L which is parallel to the grid wires is concerned. FIG. 2 illustrates the step of bonding the supporting conductors 13 and 14 to the grid frame 11 and grid conductors 12. The supporting conductors are positioned on the grid with shims of solder 15 interposed in those areas where bonding is desired. These shims may to advantage be formed of an eutectic alloy of titanium and thorium, i.e., 12 weight percent titanium and 88 percent thorium which has a melting temperature of approximately 1190° C. The finished grid is shown in FIG. 3 in which the L-shaped support wires 14 are bonded at opposite ends to the grid frame or washer 11 and also one arm of each of the L-shaped members is bonded to the parallel grid wires at the crossings thereof.

Figure 4:
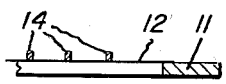
FIG. 4 is a sectional view taken along the lines 4—4 of FIG. 3.

As a specific example of a grid embodying my invention, a grid washer of tungsten having an outer diameter of 450 mils and an opening of 350 mils in diameter is provided with approximately 100 parallel wires of tungsten 1 mil in diameter. These wires may be wound on the grid washer on a grid lathe and then brazed to the washer in accordance with well known techniques for making parallel wire grids. As illustrated in FIG. 2 the support wires are of substantially larger size and if circular in cross-section may be approximately 5 mils in diameter and the titanium-thorium eutectic brazing material is in the form of shims approximately .5 mils thick. With the assembly as shown in FIG. 2 the parts are heated in a vacuum to a temperature a little above 1190° C. and allowed to cool so that the support wires are bonded to the parallel grid wires and to the grid frame. It is to be noted that three of the supports are thus free to elongate in one direction as they expand and the other three in the opposite direction, the expansion being accommodated by movement of the arm of the L-shaped members which are parallel to the grid wires. It will be readily appreciated that the movement of the arms of the support wires bonded to the grid wires will tend to take up any slack in the grid wires produced by uneven expansion in the grid structure. The uneven expansion is most marked when there is a large heat generation in the grid due to a large grid current so that the central portion of the grid tends to run hotter than the marginal portion. Instead of being arranged in groups, it will be apparent that the oppositely extending L-shaped grid members may be alternately arranged. Also, the support wires may be rectangular in cross-section instead of round with the larger transverse dimension extending in a direction normal to the plane of the grid. This is illustrated by the sectional view of FIG. 4. In such an embodiment the dimension of the rectangular support conductors may be in the order of 3 by 5 mils, for example. The right angle bend in the support wires permits bending in a plane parallel to the grid and minimizes distortion of these members in a direction normal to the plane of the grid wires.

Figure 5:
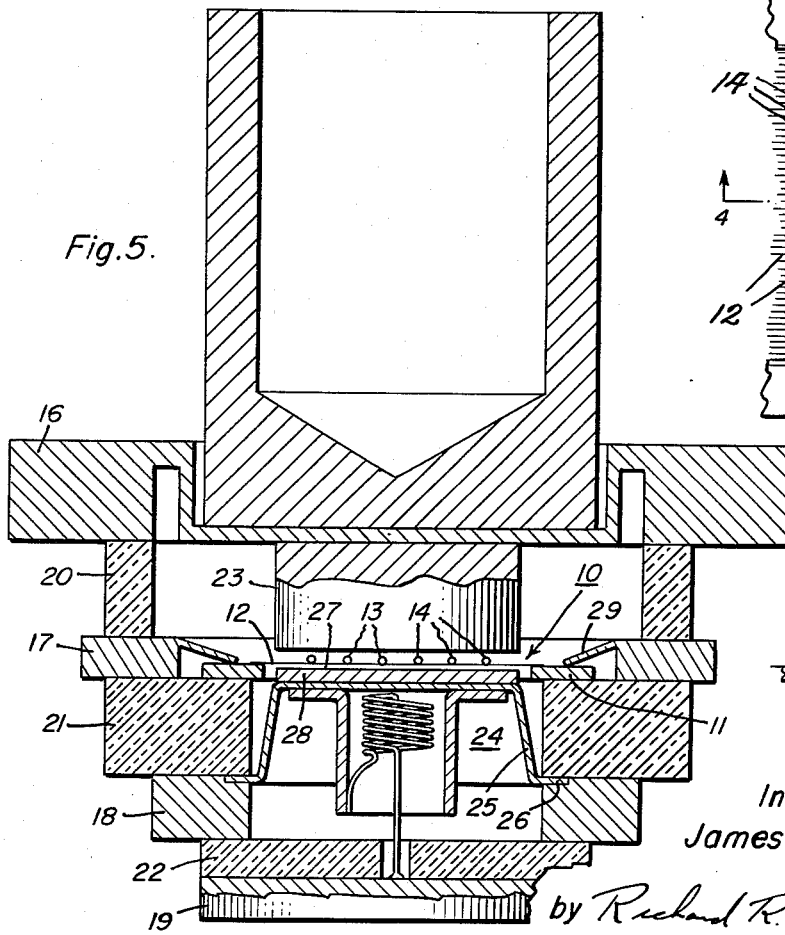
FIG. 5 is an elevation view in section of an electric discharge device of a type in which the improved grid of the present invention may be used to advantage.

In FIG. 5 is illustrated an elevation view in section of an electric discharge device of a type in which a grid embodying my invention may be employed to advantage. As there illustrated, the device includes a plurality of metal terminal members 16–19, inclusive, which are separated and mutually insulated by ceramic insulating members 20–22, inclusive. The members 16–22 are bonded together in accordance with bonding methods well known in the art and provide the vacuum tight envelope and externally accessible terminals for the device. The electrodes of the device are supported within the envelope and electrically connected respectively with the metal terminals 16–19, inclusive. A cylindrical anode 23 is supported from the central inner surface of the anode terminal 16 and a cathode assembly 24 is supported from a cathode cup 25 having an outwardly extending flange 26 bonded to the cathode terminal 18. The emitting surface of the cathode is provided by a coating of electron emission enhancing material 27 on the upper surface of the circular cathode disk 28. As illustrated, a grid structure 10 is retained between the upper surface of the insulating spacer 21 and an inwardly directed flange 29 formed integrally with the grid terminal 17. In devices of the type described above the grid cathode spacing is often very small, for example in the order of 1.5 mils and in such a device it is extremely important that the grid not distort from its normal plane during operation of the device. Since operation often entails grid currents of significant magnitude, there is developed due to this grid dissipation a substantial temperature gradient from the central portion of the grid wires to the grid frame and this aggravates the sagging or distortion problem to a considerable extent. It has been found that with grids made in accordance with the present invention that no shorting or other difficulties due to distortion of the grid is encountered with grid currents up to 200 milliamps in magnitude whereas a plane parallel grid in the same tube structure but with no support wires fails to operate satisfactorily with grid currents in excess of 30 milliamps. In view of the above, it is clear that the present invention provides an improved grid structure particularly for use in devices having planar electrodes and close grid-cathode spacings.

While I have shown and described a particular embodiment of my invention, it will be apparent to those skilled in the art that changes and modifications may be made without departing from my invention in its broader aspects and I aim, therefore, in the appended claims to cover all such changes and modifications as fall within the true spirit and scope of my invention.

What I claim as new and desire to secure by Letters Patent of the United States is:

1. A taut planar grid for an electric discharge device comprising a grid frame having an aperture therethrough, a plurality of parallel grid conductors extending across said aperture and bonded to said frame and a plurality of elongated metal members extending across a plurality of said grid conductors in a direction generally orthogonal to said grid conductors, said elongated members each being bonded to the grid conductors crossed thereby and secured at one end thereof to an opposite side of said grid frame and the other ends thereof being free to move in opposite directions transverse to the length of said grid conductors to maintain taut the grid conductors to which said elongated metal members are bonded.

2. A taut planar grid for an electric discharge device comprising a grid frame having an aperture therethrough, a plurality of parallel grid conductors extending across said aperture and bonded to said frame and an elongated metal member extending across a plurality of said grid conductors in a direction generally orthogonal to said grid conductors, said elongated metal member being bonded to the grid conductors crossed thereby and secured at one end thereof to said grid frame and the other end thereof being free to move in a direction transverse to the length of said grid conductors to maintain taut the grid conductors to which said elongated metal member is bonded.

3. A taut planar grid for an electric discharge device comprising a grid frame having an aperture therethrough, a plurality of parallel grid wires extending across said aperture and bonded to said frame and a plurality of elongated metal members extending across a plurality of said grid wires in a direction generally orthogonal to said grid wires, said elongated members each being bonded to the grid wires crossed thereby and alternate ones of said metal members being secured at one end thereof to said grid frame on one side of said aperture and one end of the remaining metal members being secured to said grid frame on the opposite side of said aperture and the unsecured ends of said metal members being free to move in a direction transverse to the length of said grid wires to maintain taut the grid wires to which said elongated metal members are bonded.

4. A taut planar grid for an electric discharge device comprising a grid frame having an aperture therethrough, a plurality of parallel grid wires extending across said aperture and bonded to said frame and a plurality of L-shaped metal members having one leg of each member extending across a plurality of said grid wires in a direction generally orthogonal to said grid wires and the other leg extending generally parallel to said grid wires, the ends of the legs of said L-shaped metal members being secured to spaced parts of said grid frame and the legs of said members being bonded to the grid wires crossed thereby.

5. A taut planar grid for an electric discharge device comprising a grid frame having an aperture therethrough, a plurality of parallel grid wires extending across said aperture and bonded to said frame and a plurality of groups of L-shaped metal members, one leg of each member extending across a plurality of said grid wires in a direction generally orthogonal to said grid wires and the other leg of the members of one group extending generally parallel to said grid wires in one direction and the other leg of the metal members of the other group extending along said grid wires in the opposite direction, the ends of the legs of said L-shaped metal members being secured to spaced parts of said grid frame and the legs of said members being bonded to the grid wires crossed thereby.

No references cited.

JAMES D. KALLAM, *Acting Primary Examiner.*

R. POLISSACK, *Assistant Examiner.*